United States Patent
Zuber

[19]
[11] Patent Number: 5,910,177
[45] Date of Patent: Jun. 8, 1999

[54] NAVIGATING CLOSE PROXIMITY ROUTES WITH A VEHICLE NAVIGATION SYSTEM

[75] Inventor: Gary Zuber, Santa Clara, Calif.

[73] Assignee: Visteon Technologies, LLC, Dearborn, Mich.

[21] Appl. No.: 08/761,868

[22] Filed: Dec. 9, 1996

[51] Int. Cl.[6] .......................... G01C 21/00; G06F 165/00
[52] U.S. Cl. ............................................ 701/202; 701/209
[58] Field of Search .................................. 701/201, 202, 701/208, 209, 210, 211; 73/178 R; 340/990, 995

[56] References Cited

U.S. PATENT DOCUMENTS

| | | |
|---|---|---|
| 3,845,289 | 10/1974 | French . |
| 4,570,227 | 2/1986 | Tachi et al. . |
| 4,608,656 | 8/1986 | Tanaka et al. . |
| 4,611,293 | 9/1986 | Hatch et al. . |
| 4,672,565 | 6/1987 | Kuno et al. . |
| 4,673,878 | 6/1987 | Tsushima et al. . |
| 4,734,863 | 3/1988 | Honey et al. . |
| 4,737,218 | 4/1988 | Hasebe et al. . |
| 4,751,512 | 6/1988 | Longaker . |
| 4,782,447 | 11/1988 | Ueno et al. . |
| 4,796,191 | 1/1989 | Honey et al. . |
| 4,797,841 | 1/1989 | Hatch . |
| 4,831,563 | 5/1989 | Ando et al. . |
| 4,862,398 | 8/1989 | Shimizu et al. . |
| 4,914,605 | 4/1990 | Loughmiller, Jr. et al. . |
| 4,918,609 | 4/1990 | Yamawaki . |
| 4,926,336 | 5/1990 | Yamada . |
| 4,937,753 | 6/1990 | Yamada . |
| 4,964,052 | 10/1990 | Ohe . |
| 4,970,652 | 11/1990 | Nagashima . |
| 4,982,332 | 1/1991 | Saito et al. . |
| 4,984,168 | 1/1991 | Neukrichner et al. . |
| 4,989,151 | 1/1991 | Nuimura . |
| 4,992,947 | 2/1991 | Nimura et al. . |
| 4,996,645 | 2/1991 | Schneyderberg Van DerZon . |
| 4,999,783 | 3/1991 | Tenmoku et al. . |
| 5,040,122 | 8/1991 | Neukirchner et al. . |
| 5,046,011 | 9/1991 | Kakihara et al. . |
| 5,060,162 | 10/1991 | Ueyama et al. . |
| 5,177,685 | 1/1993 | Davis et al. . |
| 5,283,743 | 2/1994 | Odagawa . |
| 5,287,297 | 2/1994 | Ihara et al. . |
| 5,297,050 | 3/1994 | Ichimura et al. . |
| 5,612,882 | 3/1997 | LeFebvre et al. ...................... 701/209 |
| 5,752,217 | 5/1998 | Ishizaki et al. ......................... 701/211 |

OTHER PUBLICATIONS

French, *MAP matching Origins Approaches and Applications,* Rober L. French & Associates, 3815 Lisbon St., Suite 201, Fort Worth, Texas 76107, USA, pp. 91–116.

*Primary Examiner*—William A. Cuchlinski, Jr.
*Assistant Examiner*—Ed Pipala
*Attorney, Agent, or Firm*—Joseph M. Villeneuve; Beyer & Weaver, LLP

[57] ABSTRACT

A method and apparatus are provided for generating a route from a source location to a destination in a vehicle navigation system. Initially, the system generates a first partial route from the source location to the end of the first partial route. The system then determines whether a second maneuver is within a first distance from a first maneuver at the end of the first partial route. Where the second maneuver is within the first distance, the system increases the cost associated with the second maneuver. The system then generates a second partial route from the end of the first partial route to the destination, generation of the second partial route being based at least in part on the cost associated with the second maneuver.

16 Claims, 6 Drawing Sheets

NAVIGATING CLOSE PROXIMITY ROUTES WITH A VEHICLE NAVIGATION SYSTEM

BACKGROUND OF THE INVENTION

The present invention relates to methods and apparatus for ensuring that a route generated by a vehicle navigation system may be safely navigated by the user. More specifically, the present invention provides a vehicle navigation system which generates routes which are less likely to include consecutive maneuvers which are difficult and/or hazardous to execute.

Currently available vehicle navigation systems typically generate routes using variations of well known search algorithms in conjunction with commercially available map databases. Some algorithms attempt to generate optimum routes, i.e., shortest distance or shortest travel time, using a variety of techniques. Unfortunately, while these algorithms typically generate routes which obey travel restrictions, e.g., one-way streets, and avoid prohibited maneuvers, they do not typically determine whether a maneuver is difficult to execute before including it in the generated route. FIGS. 1–5 show several examples of troublesome consecutive maneuvers.

In FIG. 1, route 100 includes a right turn from road 102 to road 104, followed by a left turn onto road 106. The first maneuver, the right turn, places the vehicle in the far right lane of road 104 which is a four-lane, one-way road. The left turn onto road 106 is less than 200 feet down the road from the intersection of roads 102 and 104, and must be executed from the far left lane of road 104. While these consecutive maneuvers are theoretically possible, the second maneuver, i.e., the left turn, is extremely difficult and potentially hazardous because so many lanes of traffic must be crossed in such a short distance. The situation becomes even more hazardous where, as is often the case, the user is relying heavily on the generated route because she is not familiar with the area.

FIG. 2 shows a similar situation except that road 204 is a two-way road. In this situation, the danger arises from entering the stream of traffic on road 204 from road 202, and stopping abruptly within a short distance for the purpose of making the required left turn onto road 206. FIGS. 3 and 4 show situations similar to FIGS. 1 and 2 except that the first maneuver is a left turn and the second is a right turn. FIG. 5 shows a situation in which the first maneuver involves exiting the westbound section of a freeway 502 and a second maneuver which is a left turn onto road 504 across oncoming traffic which is entering freeway 502. The difficulty and danger associated with such a scenario is self evident.

In view of the foregoing discussion, it is apparent that some means for reducing the incidence of difficult and/or dangerous consecutive maneuvers in a generated route is desirable.

SUMMARY OF THE INVENTION

According to the present invention, a method and appparatus are provided which determine whether two maneuvers are too closely spaced for the second maneuver to be included in the generated route. The vehicle navigation system of the present invention searches a map database for road segments to be included in the generated route. The system also generates a series of maneuver instructions to be communicated to the driver which correspond to the maneuvers in the generated route. After including a particular maneuver in the route, the search algorithm identifies a second maneuver which could potentially be included in the route. Depending on a number of factors, the system then determines whether the second maneuver is within some threshold distance of the first maneuver. The factors which determine this threshold distance may include, but are not limited to, whether the first and second maneuvers are in opposite directions (e.g., the first is right and the second is left), and the number of lanes, the width, and/or the speed limit of the road segment connecting the two maneuvers.

If, given these factors, the second maneuver is determined to be within the threshold distance, the cost associated with the second maneuver is increased so that the search algorithm is less likely to include that maneuver in the route. In this way, the incidence of potentially dangerous consecutive maneuvers in a generated route is reduced. It should be noted, however, that, according to this embodiment, the second maneuver is not entirely eliminated from consideration for inclusion in the route. This allows for the case where the second maneuver may be necessary to the completion of a route.

It should also be noted that a number of variations on the above-described embodiment are within the scope of the present invention. For example, according to another embodiment, the cost associated with the second maneuver is increased by a variable amount, the value of which is dependent on the distance between the first and second maneuvers. In yet another embodiment, the threshold distance is a fixed value for each of a number of categories in which the road segment connecting the two maneuvers might be included. That is, for example, if the road segment connecting the two maneuvers is part of a major surface street, the threshold distance could be 200 feet. If, however, the road segment is part of an expressway or freeway, the threshold distance could be 1000 feet. In still another embodiment, rather than increasing the cost of the maneuver, the system ignores the maneuver for route generation purposes. Alternatively, the system prohibits access to the maneuver and/or its associated road segments.

Thus, according to the invention, a method and apparatus are provided for generating a route from a source location to a destination in a vehicle navigation system. Initially, the system generates a first partial route from the source location to the end of the first partial route. The system then determines whether a second maneuver is within a first distance from a first maneuver at the end of the first partial route. Where the second maneuver is within the first distance, the system manipulates a parameter associated with the second maneuver (e.g., the cost). The system then generates a second partial route from the end of the first partial route to the destination, generation of the second partial route being based at least in part on the parameter associated with the second maneuver.

A further understanding of the nature and advantages of the present invention may be realized by reference to the remaining portions of the specification and the drawings.

DESCRIPTION OF THE PREFERRED EMBODIMENT

The present invention relates generally to commonly assigned U.S. Pat. No. 5,345,382 to Kao for CALIBRA- TION METHOD FOR A RELATIVE HEADING SENSOR, No. 5,359,529 to Snider for ROUTE GUIDANCE ON/OFF-ROUTE STATE FILTER, No. 5,374,933 to Kao for POSITION CORRECTION METHOD FOR VEHICLE NAVIGATION SYSTEM, and No. 5,515,283 to Desai et al. for METHOD FOR IDENTIFYING HIGHWAY ACCESS RAMPS FOR ROUTE CALCULATION IN A VEHICLE NAVIGATION SYSTEM, the entire specifications of which are incorporated herein by reference.

Figure 2:
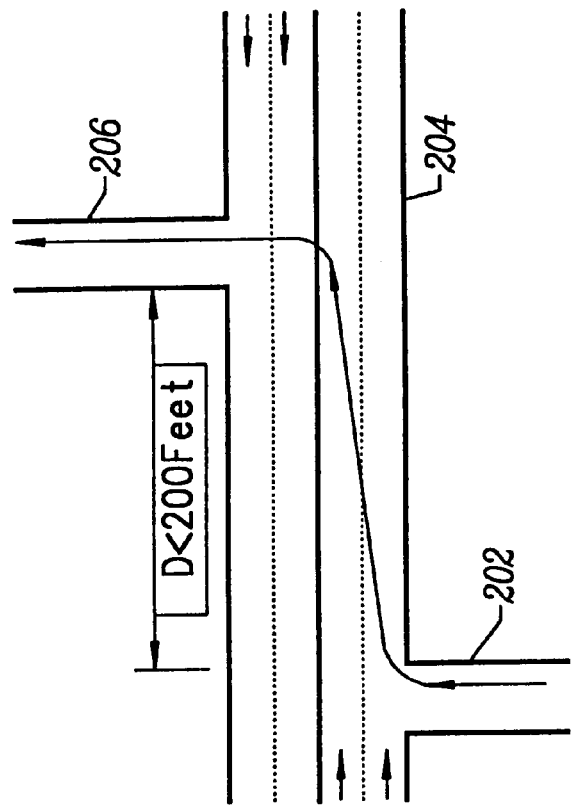
FIGS. 1–5 are a series of diagrams illustrating consecutive maneuvers which are potentially dangerous to execute.
Figure 1:
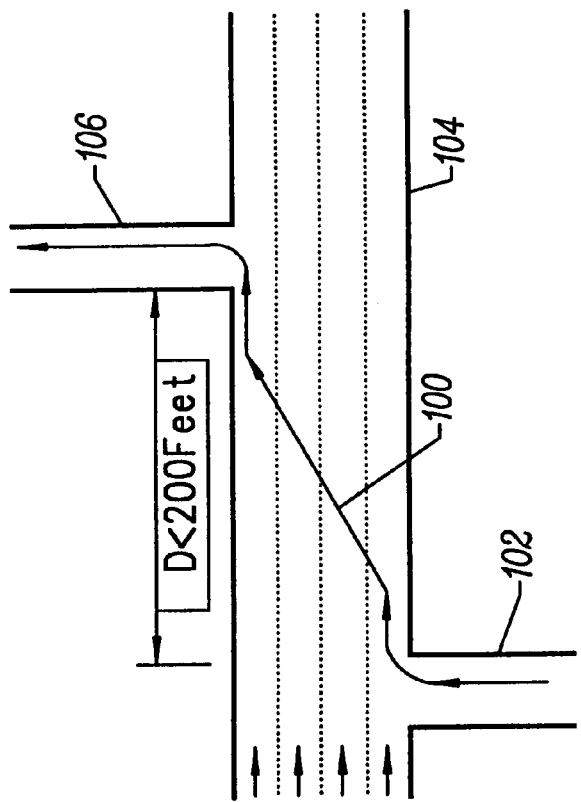
Figure 4:
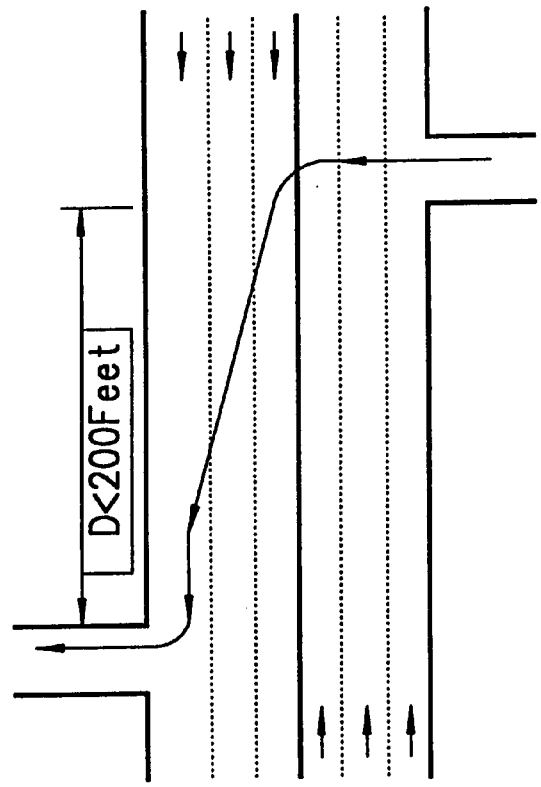
Figure 3:
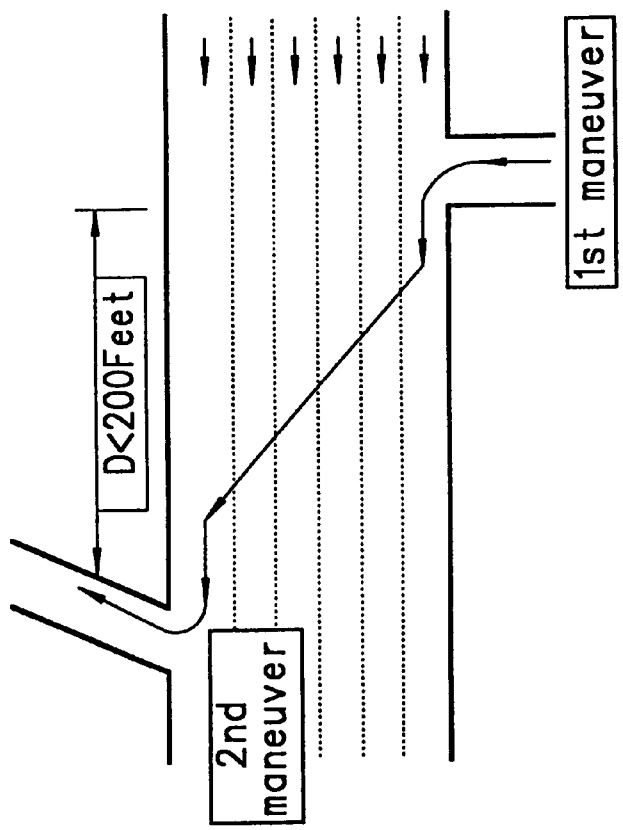
Figure 5:
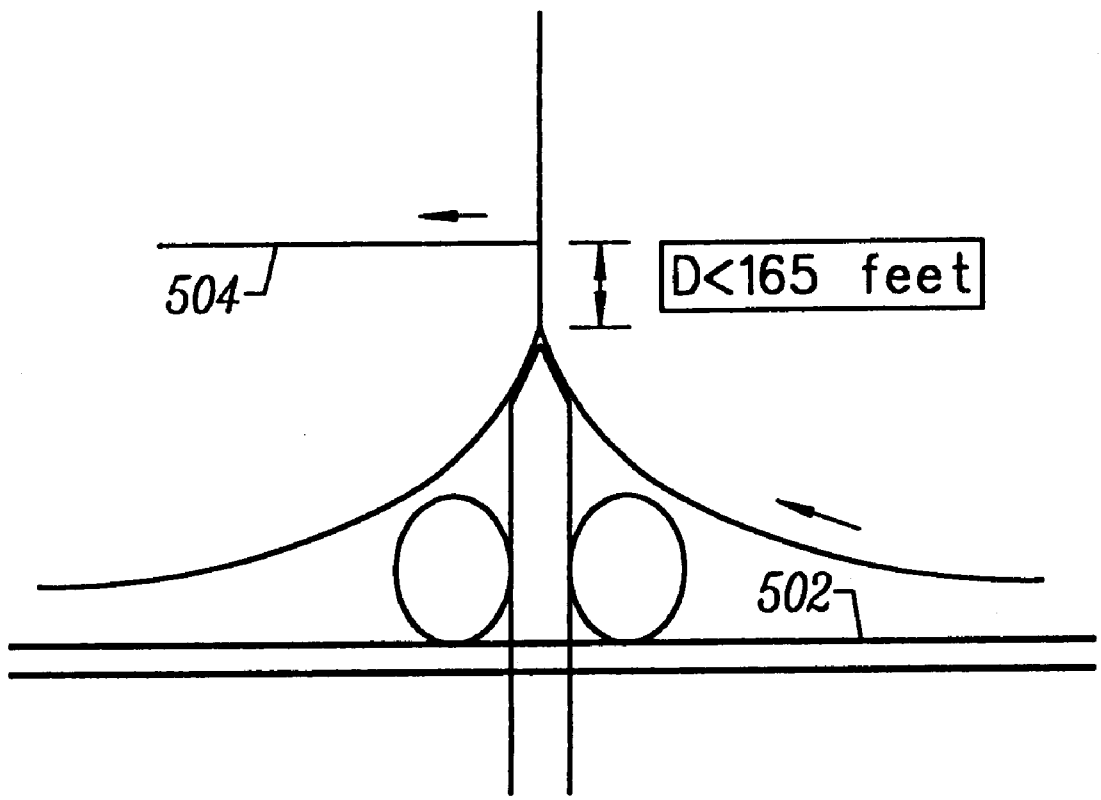
Figure 6:
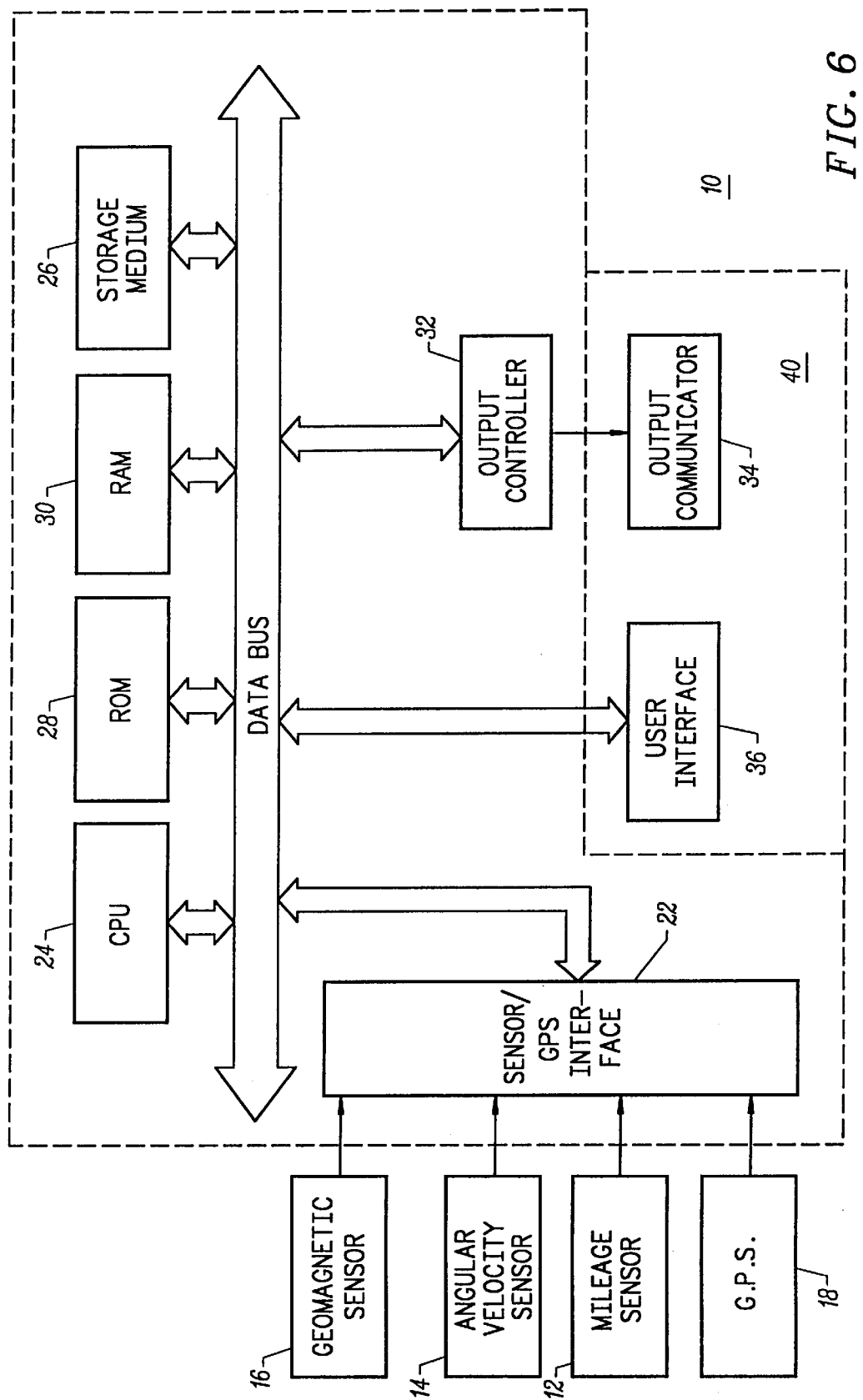
FIG. 6 is a block diagram of a vehicle navigation system for use with the present invention.

FIG. 6 is a block diagram of a specific embodiment of a vehicle navigation system 10 for use with the present invention. Sensors 12 and 14 and GPS receiver 18 are coupled to computing means 20 through sensor/GPS interface 22. In typical embodiments, mileage sensor 12 comprises an odometer, and angular velocity sensor 14 comprises a gyroscope, or a differential odometer coupled to the wheels of the vehicle. A global positioning system (GPS) data receiver 18 is provided for receiving signals from, for example, a satellite-based navigation system. Data from sensor/GPS interface 22 is transmitted to CPU 24, which performs calibration, signal processing, dead-reckoning, vehicle positioning, and route guidance functions. A database containing map information may be stored in database medium 26, with software directing the operation of computing means 20 stored in main memory 28 for execution by CPU 24. Memory 28 may comprise read-only memory (ROM), or reprogrammable non-volatile memory such as flash memory or SRAM. System RAM 30 permits reading and writing of the information necessary to execute such software programs. Database medium 26 may comprise non-volatile memory, a hard disk drive, CD-ROM, or an integrated circuit in which digitized map information has been stored. Output controller 32, which may comprise a graphics controller, receives data processed by CPU 24 and transmits the data to display console 40 which includes output communicator 34, usually comprising a display screen with associated audio electronics and audio speakers. The driver may input data, such as a desired destination, through user interface 36, typically comprising a keyboard.

The map database stored in database medium 26 preferably comprises positional data such as, for example, latitude and longitude coordinates, to describe road intersections or nodes, road segments, landmarks and points of interest, and other geographical information. The data base may further comprise data representing characteristics of roads or places on the map, such as road and place names, road features such as dividers, one-way restrictions, surface, speed limit, shape, elevation, and other properties. According to specific embodiments of the invention, the map database includes cost values associated with individual nodes and road segments. These cost values correspond to the estimates of time intervals for traversing the respective node or segment. Node cost values take into consideration such information as, for example, whether the vehicle would encounter oncoming traffic, thus delaying a left turn maneuver. Segment costs reflect road segment characteristics such as speed limit and segment length, both of which affect the travel time along the segment. Also associated with each road in the map database is a link class which relates to the category or type of the road. For example, the highest level category of the hierarchy is the link class FREEWAY. The lowest level includes the link classes FRONTAGE and MISC which include, for example, frontage roads and alleys.

The vehicle navigation system of the present invention is operable to generate a route from a source location to a destination according to a variety of different methods. Some examples of such methods are described in the U.S. patents which are incorporated by reference into the present specification above. In addition, further methods for route generation which may be employed in conjunction with the present invention are described in commonly assigned, copending U.S. patent application Ser. No. 08/784,204 for ROUTE GENERATION IN A VEHICLE NAVIGATION SYSTEM, filed on Jan. 15, 1997, 1996, the entire specification of which is also incorporated herein by reference.

Figure 7A:
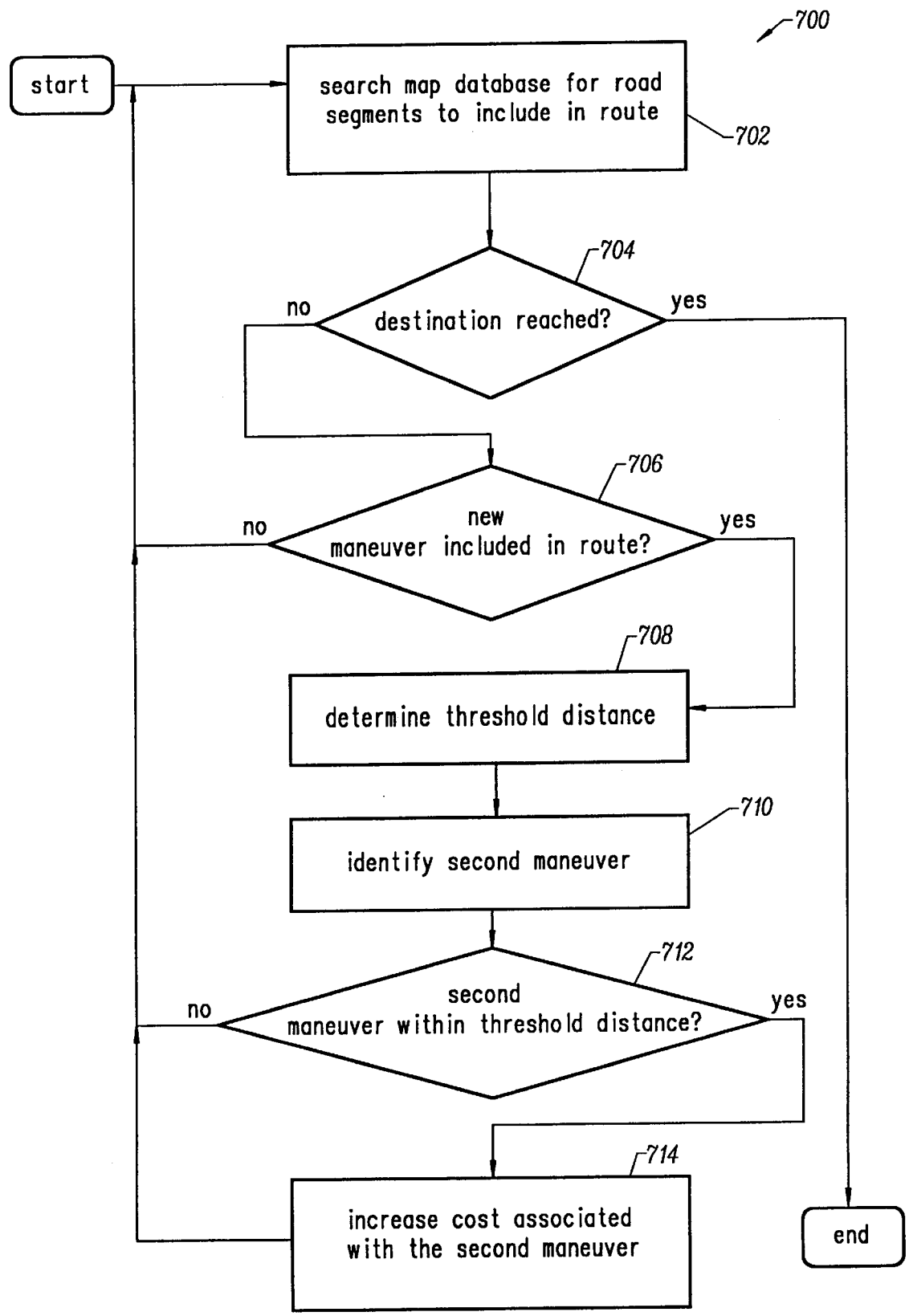
FIGS. 7A and 7B are flowcharts illustrating operation of two specific embodiments of the present invention.

FIG. 7A is a flowchart 700 illustrating operation of a specific embodiment of the present invention. As discussed above, the system searches its map database for road segments to include in the generated route according to any of a variety of search algorithms (step 702) until the destination is reached (step 704). When a new maneuver has been included in the route (step 706) a threshold distance is determined (step 708). As long as no new maneuvers are encountered, the algorithm continues to search for road segments. The threshold distance is the distance within which a second maneuver would be considered potentially difficult or dangerous. The threshold distance may be determined according to various embodiments of the invention. For example, the threshold distance may be a fixed distance, e.g., 200 feet. Alternatively, the threshold distance may vary with the type of road segment which connects the two maneuvers. That is, the threshold distance for a freeway would be greater than that for a major surface street in a residential area.

Once a threshold distance is determined, a second maneuver is identified which could potentially be included in the generated route (step 710). If the second maneuver is within the threshold distance (step 712), the cost associated with that maneuver is increased to decrease the likelihood that the maneuver will be included in the generated route (step 714). The search algorithm then continues to generate the route based at least in part on this increased cost. If the second maneuver is not within the threshold distance, the algorithm continues to search for additional road segments in the usual manner.

Figure 7B:
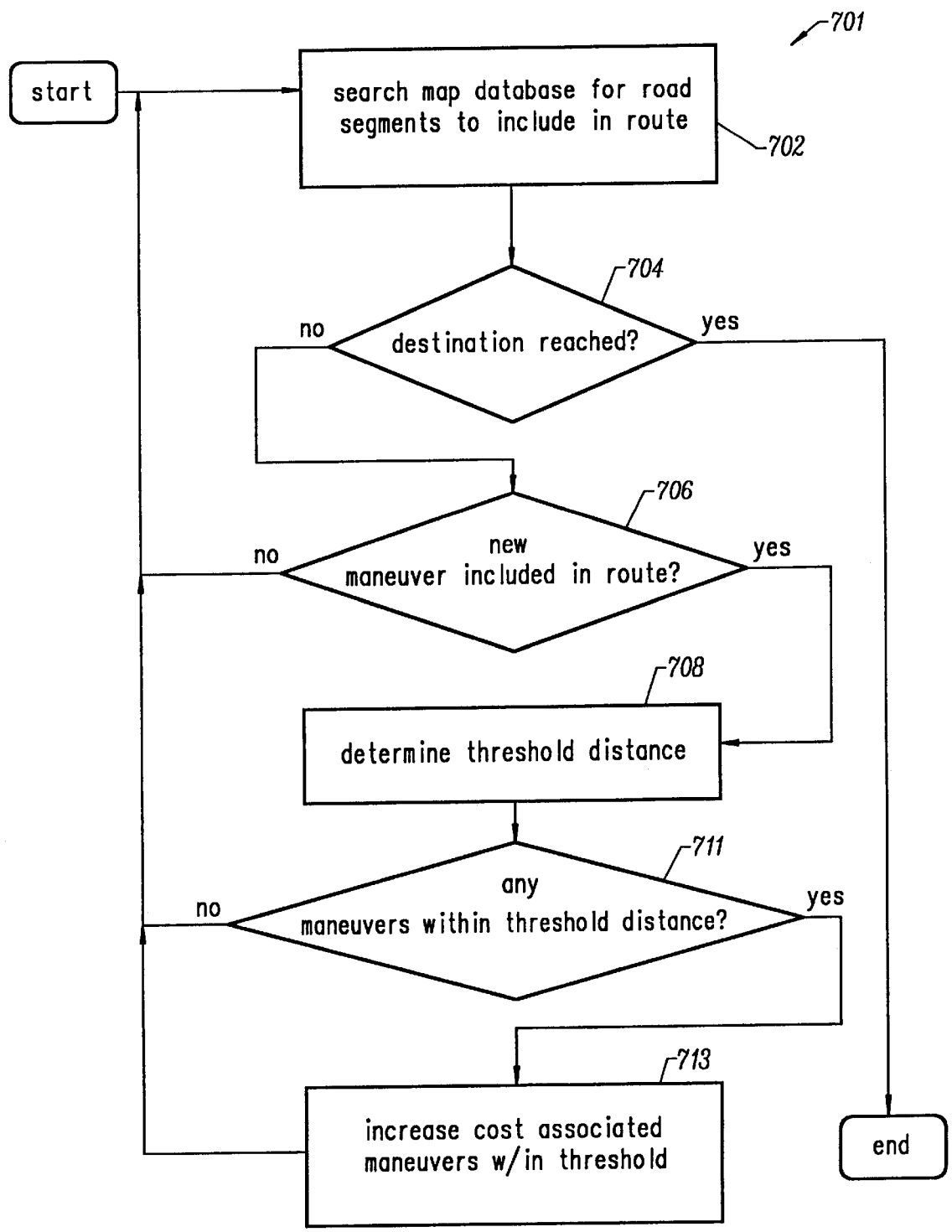

FIG. 7B is a flowchart 701 illustrating an alternate embodiment of the present invention. Steps 702 through 708 are substantially the same as discussed above with reference to FIG. 7A. However, once the threshold distance is determined, the algorithm determines whether there any potential maneuvers within the threshold distance (step 711). If there are none, the algorithm continues to search for additional road segments. If, however, potential maneuvers are identified within the threshold distance, the cost associated with each of the maneuvers is increased to decrease the likelihood that the maneuver will be included in the generated route (step 713). The search algorithm then continues to generate the route based at least in part on these increased costs.

The manner in which the costs associated with maneuvers are increased may vary according to different embodiments of the invention. For example, a fixed increment may be applied to the cost. Alternatively, the increment applied to the cost may vary according to the distance between the first and second maneuvers. Additionally, the magnitude of the increment may be dependent upon the type of road segment connecting the two maneuvers and/or the speed limit on that segment. It will be understood that the scope of the present invention includes but is not limited to these embodiments.

While the invention has been particularly shown and described with reference to specific embodiments thereof, it will be understood by those skilled in the art that the foregoing and other changes in the form and details may be made therein without departing from the spirit or scope of the invention. For example, the embodiments of the present invention have been described above with reference to manipulation of the cost associated with a second maneuver to effect the goal of avoiding inclusion of difficult or dangerous successive maneuvers in a generated route. However, it will be understood that the present invention would encompass a system in which the search algorithm is prohibited from including a second maneuver within a threshold distance of a first maneuver in a generated route. This may be accomplished by dramatically increasing the cost of the second maneuver. It could also be achieved through some other mechanism which causes the search algorithm to ignore the maneuver and its associated road segments. Such a mechanism might, for example, remove such maneuvers from the map database for the current search. Alternatively, the system might develop a list of such maneuvers which are prohibited from inclusion in the route, checking each new segment candidate against the list and eliminating any matches from consideration. These are only some of the many possibilities within the scope of the invention. In view of the foregoing discussion, the scope of the invention should therefore be determined by reference to the appended claims.

What is claimed is:

1. A method for generating a route from a source location to a destination in a vehicle navigation system, the method comprising the steps of:
    generating a first partial route from the source location to an end of the first partial route, the first partial route including a first maneuver;
    determining whether a second maneuver is within a first distance from the first maneuver;
    where the second maneuver is within the first distance, manipulating a parameter associated with the second maneuver; and
    generating a second partial route from the end of the first partial route to the destination based at least in part on the parameter associated with the second maneuver.

2. The method of claim 1 wherein the first and second maneuvers are connected by a road segment, the first distance being determined with regard to a characteristic of the road segment.

3. The method of claim 2 wherein the characteristic comprises a number of lanes in the road segment.

4. The method of claim 2 wherein the characteristic comprises a width of the road segment.

5. The method of claim 2 wherein the characteristic comprises a link class of the road segment.

6. The method of claim 1 wherein the step of manipulating the parameter comprises increasing a cost associated with the second maneuver.

7. The method of claim 6 wherein the cost is increased by a variable amount, the variable amount varying with a second distance between the first and second maneuvers.

8. The method of claim 1 wherein the step of manipulating the parameter comprises prohibiting access to the second maneuver.

9. The method of claim 1 wherein the step of manipulating the parameter comprises ignoring the second maneuver for generation of the second partial route.

10. The method of claim 1 wherein the first maneuver comprises exiting a highway and the second maneuver comprises an abrupt turn.

11. The method of claim 1 wherein the first maneuver comprises a first turn in a first direction and the second maneuver comprises a second turn in a second direction, the first and second directions being substantially opposed.

12. The method of claim 1 wherein the first direction is left and the second direction is right.

13. The method of claim 1 wherein the first direction is right and the second direction is left.

14. An apparatus for generating a route from a source location to a destination in a vehicle navigation system, the method comprising the steps of:
    means for generating a first partial route from the source location to an end of the first partial route, the first partial route including a first maneuver;
    means for determining whether a second maneuver is within a first distance from the first maneuver;
    means for manipulating a parameter associated with the second maneuver where the second maneuver is within the first distance; and
    means for generating a second partial route from the end of the first partial route to the destination, generation of the second partial route being based at least in part on the parameter associated with the second maneuver.

15. A vehicle navigation system, comprising:
    a plurality of sensors for detecting a current vehicle position and a vehicle heading, and generating signals indicative thereof;
    a database medium having geographic locations of a plurality of road segments and segment nodes stored therein;
    a processor coupled to the sensors and the database medium for generating a route from a source location to a destination, the processor being operable to:
        (a) generate a first partial route from the source location to an end of the first partial route, the first partial route including a first maneuver;
        (b) determine whether a second maneuver is within a first distance from the first maneuver;
        (c) where the second maneuver is within the first distance, manipulate a parameter associated with the second maneuver; and
        (d) generate a second partial route from the end of the first partial route to the destination based at least in part on the parameter associated with the second maneuver; and
    an output communicator coupled to the processor for communicating the route to a user of the vehicle navigation system.

16. A computer program product for determining a route from a source location to a destination, comprising:
    a computer-readable medium; and
    a computer program mechanism embedded in the computer-readable medium for causing a computer to perform the steps of:
        generating a first partial route from the source location to an end of the first partial route, the first partial route including a first maneuver;
        determining whether a second maneuver is within a first distance from the first maneuver;
        where the second maneuver is within the first distance, manipulating a parameter associated with the second maneuver; and
        generating a second partial route from the end of the first partial route to the destination based at least in part on the parameter associated with the second maneuver.

* * * * *